Sept. 29, 1959   R. G. COWEN   2,907,017
IMPEDANCE ALARM SYSTEM
Filed Aug. 4, 1958

INVENTOR.
RICHARD G. COWEN
BY
Roland G. Anderson
ATTORNEY.

United States Patent Office 2,907,017
Patented Sept. 29, 1959

2,907,017

IMPEDANCE ALARM SYSTEM

Richard G. Cowen, Silver Spring, Md., assignor to the United States of America as represented by the United States Atomic Energy Commission Application August 4, 1958, Serial No. 753,167

5 Claims. (Cl. 340—258)

This invention relates to electric protective systems and more particularly to burglar alarm systems of the capacitance type in which the approach of an intruder at a place to be protected varies the capacitance in an electric circuit and the change is thereafter communicated to a remote point to actuate an alarm.

In considering the value of a particular protective system several factors have significant importance. Of first concern is the susceptibility of the system while in operation to acts by hostile persons which will render the system inoperative. This factor is generally referred to as the defeatability of the system.

The three major points in a protective system where defeat measures may be taken are at the sensing means, at the detector which is controlled by the sensing means and along the line between the detector and the remote monitor-alarm means. At the sensing means, where the sensing capacitance may be in the form of a safe insulated from ground, or an antenna type structure, one defeat measure that may defeat a protective system is the disconnection of the safe or antenna, resulting in a decrease in sensed capacitance. This effect is in contrast to the increase in sensing capacitance due to an approaching person. It can be seen that the subsequent detector must sense both increase and decrease of sensing capacitance and produce an output signal indicating any change in sensing capacitance to counter this defeat measure.

The detector sensitivity should also be as high as practical to have the protective system cover a maximum area. A problem particularly troublesome in the not crystal controlled, sinusoidal-oscillator type detector is the change in both frequency and amplitude of the detector signal as the sensing capacitance is varied. These two variables do not always work together to give maximum sensitivity, i.e. one may offset the other to reduce the change in detector output over the change effected by having the detector output determined by only one variable of the oscillator signal. It would then be advantageous to have a detector where only one characteristic of the oscillator is varied by the sensing capacitance.

A second defeat technique which may be applied at the sensing means point, in the case where the detector comprises a sinusoidal oscillator and the sensing capacitance is part of the oscillator circuit, is the detection of the radiated signal and superposition of a signal of the same frequency to saturate the detector, thereby rendering is insensitive to respond to changes in sensing capacitance. If a detector or monitor responsive only to changes in capacitance in one direction is used, this defeat technique may render the protective system inoperative (defeatable).

With respect to the defeat measures applicable to the line communicating between the detector and monitor-alarm means, the most obvious problem is the severing of the line. Consequently, the monitor must act to energize the alarm if the output signal from the detector is removed. A second technique which may be used along the line is to measure the line voltage and substitute an external source at the measured voltage. The monitor then receives the proper voltage irrespective of the activity around the sensing means. To counter this technique the monitor must be extremely sensitive to line voltage changes, in that the momentary change in voltage should cause the monitor to energize the alarm. Further, the line voltage should be as small as posisble to make measurement difficult both from the standpoint of equipment required and assurance of successful defeat of the system. In addition, the line portion of the protective system will be less susceptible to compromise if it forms a part of the sensing capacitance circuit and alters the detector output when the line is tampered with.

It can be seen from the above presentation that the sensitivity of the protective system is of prime importance. But the requirement for high sensitivity demands an even higher requirement for stability. It follows therefrom that the detector unit must be insensitive to temperature variations, as well as variations in output due to mechanical vibration, among other things.

The approach used in the prior art, wherein the sinusoidal type oscillator is used in the detector, does not satisfy the stability criteria. One form of detector incorporates the sensing capacitance as part of a tuned L-C circuit in a crystal oscillator circuit. As the sensing capacitance is changed, the resonant frequency of the tuned circuit changes and the plate current of the oscillator which is monitored at a remote point is altered. Such an arrangement is undesirable from several standpoints. In the first instance the detector output is extremely dependent on the temperature surrounding the detector. Any change in capacitance, inductance values, or crystal frequency will produce the same effect at the monitor as an approaching intruder. To correct this problem expensive components are required which reduce the desirability of the system from a commercial point of view. The detector systems incorporating tuned circuits have further limitations in that components of the oscillator must be extremely well constructed and mounted to reduce the possibility of false alarms due to component vibration.

It should be noted at this time that the reliability of a system as to false alarms is quite important. If a protective system is noted for erratic operation and many false alarms, the guards at the monitor alarm end will be prone to ignore or delay in following up after an alarm. Such a system characteristic and reputation is highly undesirable and should be avoided.

Applicant with a knowledge of the problems and limitations of the protective systems of the prior art has invented a protective system overcoming many of these undesirable features. It therefore follows that it is an object of this invention to provide a capacitance type protective system which is very difficult to defeat by known techniques.

Another object of the invention is to have a protective system including a detector for sensing both increase and decrease of sensing capacitance at the protected area and producing an output signal proportional to the sensing capacitance.

A further object of the invention is to have a highly sensitive protective system wherein the detector responds immediately to any change in sensing capacitance.

Another object of the invention is to provide a detector which is extremely stable, both as to temperature changes and mechanical vibration, while not requiring the expensive components and construction of sinusoidal type detectors.

An object of the invention is to have the communicating line between detector and monitor form a part of the capacitance sensing circuit and thereby render the protective system sensitive to tampering with the line.

Still a further object of the invention is to insure the voltage on the line between the detector and monitor-alarm is very small, making defeat by the voltage substitution technique extremely difficult.

A further object of the invention is the utilization of a monitor-alarm responsive to small changes in an input voltage received from a detector.

Another object of the invention is to provide a capacitance type protective system having small probability of giving a false alarm.

According to the invention, an astable transistor multivibrator has the amplitude of its output voltage controlled by a change in the sensing capacitance. The sensing capacitance is effectively connected between collector and base of one stage of the multivibrator circuit through the detector-to-monitor line. The output of the detector is a small D.C. voltage across the detector-to-monitor line. This D.C. voltage is amplified and monitored at the other end of the line. A monitor control circuit comprising a capacitor in series with a balance relay senses the change in line voltage after amplification. When a small change in D.C. voltage across this monitor control circuit occurs, the balanced relay is energized and actuates an appropriate alarm.

The invention itself both as to the details of its organization and its mode of operation will be best understood by reference to the following description taken in connection with the accompanying drawings.

Referring to the drawings.

Figure 1:
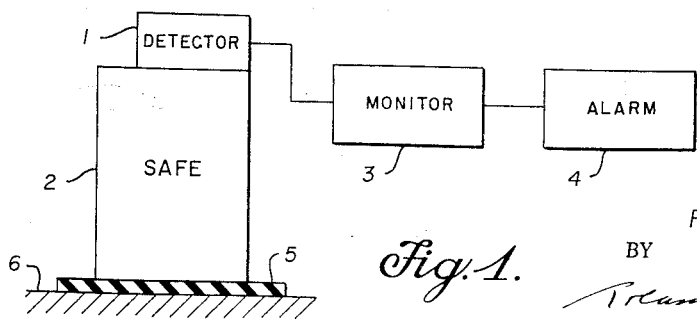
Figure 1 shows one arrangement for a protective system including a detector and monitor according to the invention.

The protective system shown in Figure 1 illustrates the general combination of major protective system components. The area to be protected may comprise a safe 2 or any other metallic objects to which the detector unit 1 may be secured. The safe 2 is generally resting on an electrically insulated material 5, such as a floor covering to insulate it from ground 6, or other grounded objects. The safe 2 and ground 5 form the plates of a capacitor 79 (see Figure 2) which is termed the sensing capacitor. If an intruder enters the vicinity of the safe his body capacitance to ground reflects to the sensing capacitor and alters its capacitance. It must be understood that the sensing capacitor may take other forms and shapes and is not limited to the instance where one plate is earth ground.

The sensing capacitor is connected into the electrical circuit of the detector to control the detector output signal across the detector-to-monitor line 77. The detector output is changed by either an increase or decrease in sensing capacitance. At some remote location a monitor 3 and alarm 4 for the system may be located. The line 77 to the monitor, a two conductor cable, has one conductor connected to ground 42 (Figure 3) at the monitor end of the line to provide the only ground connection for the detector unit. The monitor receives the output of the detector, amplifies it, and responds to a small change in the detector output signal to actuate an alarm unit 4.

Figure 2:
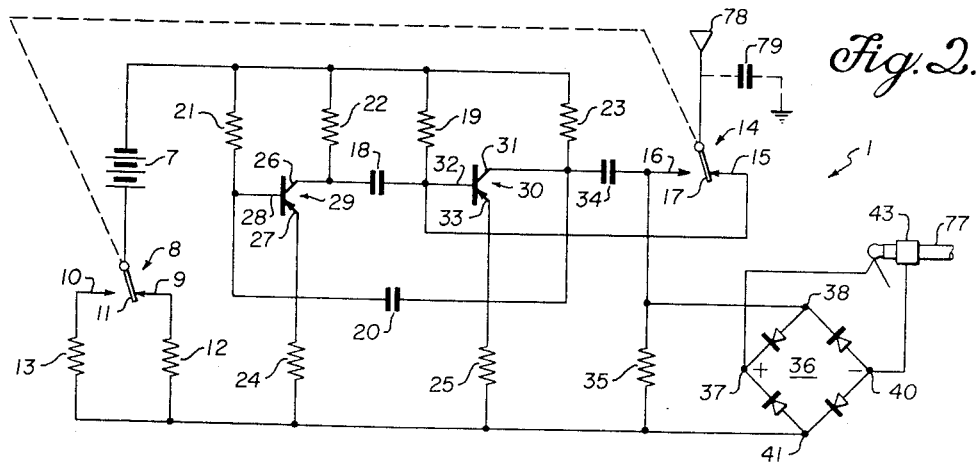
Figure 2 shows the circuit arrangement of the detector unit of the invention.

In Figure 2 the detector 1 is shown to comprise two transistors 29 and 30. These transistors are arranged in an astable multivibrator type circuit. The source of power for the detector 1 is a battery 7. Current to the bases 28 and 32 of transistors 29 and 30, respectively, are coupled through base resistances 21 and 19, respectively. The collectors 26 and 31 of these transistors are also connected to the positive terminal of battery 7 by collector resistors 22 and 23, respectively.

Connection to the battery 7 from emitters 27 and 33 is through section 8 of a double pole-double throw switch. Armature 11 of switch section 8 selects either resistor 13 or 12 for series connection to the emitters, while the emitter circuit of each transistor has an individual series resistance 24 and 25, respectively. The section 14 of the switch connects plate 78 of the sensing capacitor to the collector 31 of transistor 30 through capacitor 34 when armature 17 is closed on contact 16, and connects the sensing capacitance plate 78 to the base of 32 of transistor 30 when armature 17 is closed on contact 15.

The two positions of the control switch are termed the sensitized and desensitized positions, corresponding to when armatures 11 and 17 are closed with contacts 9 and 15, respectively, for the sensitized position and closed with contacts 10 and 16 for the desensitized position. Effectively, the selection of the desensitizing position couples the sensing capacitance to ground through the bridge circuit 36, and the emitter circuit resistances are changed to reduce the increased detector output caused by removal of the sensing capacitance from the circuit of transistor 30.

The detector 1 is designed to function as a two-stage astable multivibrator. This circuit operates by virtue of the feedback provided by two capacitors, 18 and 20 from the collector 26 of transistor 29 to the base 32 of transistor 30, and from the collector 31 of transistor 30 to the base 28 of transistor 29, respectively. The frequency of operation of the multivibrator circuit is primarily determined by the size of the coupling capacitors 18 and 20 and the base impedances 21 and 19, and may generally be approximately 16 kilocycles. The circuit generates a square wave at the collector 31 which is then coupled through a capacitor 34 to the load resistor 35. The voltage developed across the load resistor is rectified by a full-wave bridge rectifier 36. A D.C. output is taken from the rectifier 36, across points 37 and 40, and connected to a terminal jack 43. The plug from the detector-to-monitor line 77 is inserted into jack 43 to apply the detector output voltage to the line 77.

While the detector is in its sensitized state, the plate 78 of sensing capacitor 79 is connected to one stage of the multivibrator and particularly to the collector of the transistor 30. The other plate of the sensing capacitor 79, ground 5 for example, is not directly connected to the detector unit, but it is connected to the detector 1 through the line 77. More particularly, the line has one conductor grounded at its monitor end. This connects the other plate of the sensing capacitance to the detector through the line. The connection from the ground side of the line to the collector 31 of transistor 30 is through bridge circuit 36 and capacitor 34. Effectively, the sensing capacitance is connected from collector 31 to base 32 of one stage of the multivibrator, transistor 30.

The selection of the connection points for the sensing capacitor was made with definite reasons. The connection between the collector and base of a single stage in the multivibrator circuit was found to have distinct advantages. Keeping in mind that it is most desirable to have the sensing capacitance change only one characteristic of the multivibrator output, the collector-to-base connection was found to provide highly sensitive control of the signal amplitude without varying the frequency of the oscillator to any appreciable extent. This coupling or feedback from the collector-to-base circuit of a transistor provides a degenerative feedback circuit which is not inter-related with the main frequency determining components, capacitors 18 and 20 and resistors 19 and 21.

In contrast, the connection of the sensing capacitor between the base of one transistor and the collector of the other transistor would parallel the sensing capacitor with one of the coupling capacitors and result in a change in both amplitude and frequency of the multivibrator output signal. In a similar manner, the connection of the sensing capacitor between the collectors of the two transistors would also parallel a coupling capacitor and result in both amplitude and frequency change of the multivibrator output signal. Also, the sensitivity of the detector would be less in both the aforementioned connections because the low value of sensing capacitance would be shunting a relatively large value coupling capacitor. A connection of the sensing capacitor from collector to emitter of a transistor in the multivibrator would introduce regenerative feedback and provide substantially less control of the oscillator signal output in the range of usable capacitance for protective system work, approximately 15 mmfd. to 1000 mmfd.

An additional feature of the particular sensing capacitor connections is the added temperature stabilization effect. Although some transistors have characteristics which vary considerably with temperature, this particular detector has been subjected to above normal room temperatures without significant change in output. The stabilizing influence is provided by the degenerative coupling through the sensing capacitor which counters the effect on the output signal from the change in transistor characteristics as the surrounding temperature increases.

It can be seen the detector 1 does not require expensive components or construction to function. The sensitivity of the detector 1 permits detection of an intruder within 5′ of the protected safe. Further, the detector provides high sensitivity in that the amplitude of the multivibrator output is primarily controlled. In addition, the detector is extremely stable both with respect to temperature and vibration, since it does not utilize the shock and temperature sensitive circuits of the sinusoidal type oscillator protective systems, and it has a stabilizing circuit feature.

The detector output voltage across the line 77 is quite small because of the low currents available from the transistor circuits in the 9 microampere range. This feature is extremely important as it makes it impossible to defeat the line with reliability using known equipment, as aforementioned. Also, the interconnection of the line 77 with the sensing capacitance circuit greatly reduces any possibility of defeating the present protective system by tampering with the line.

Figure 3:
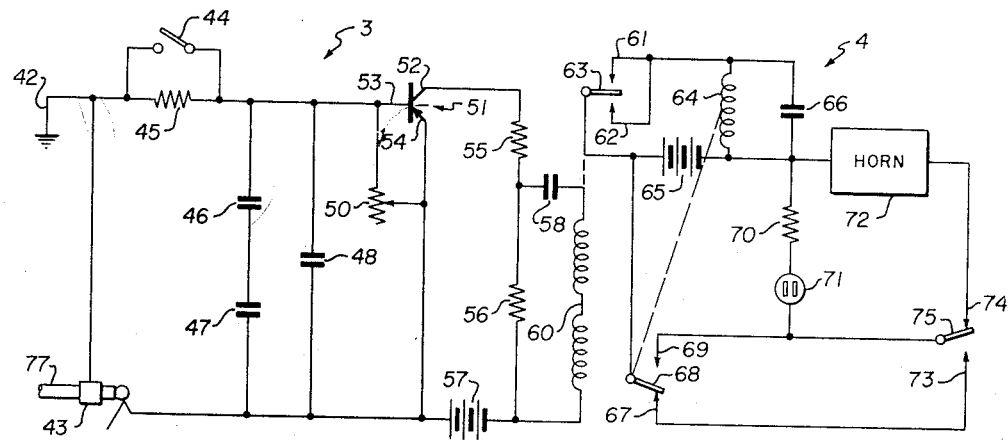
Figure 3 shows the detailed aspects of the monitor and alarm circuits of the invention.

Figure 3 shows the monitor circuit 3 and alarm circuit 4 in detail. The monitor comprises a single transistor 51 connected as a common emitter D.C. amplifier. The line voltage is received at the input jack 43 and is connected between the base 53 and emitter 54 of transistor 51. The desensitizing resistor 45 is placed in the circuit by opening switch 44 to compensate for the change in detector output when the detector is in its desensitized state. The input circuit to the amplifier also includes an A.C. filter made up of capacitors 46 and 47 and a by-pass capacitor 48. Variable resistor 50 may be adjusted to vary the input bias to the amplifier. The collector load of transistor 51 includes two series resistors 55 and 56 across which the amplifier output is developed. All the current for the monitor circuit 3 is supplied by a battery 57.

The important function of the monitor 3 is to keep a steady watch on the line voltage and respond instantaneously to sudden changes therein but not to slow changes. The detector system requires such a monitor in order to render certain defeat measures ineffective. The monitor control circuit utilized in the present invention is voltage responsive and reacts instantaneously to sudden voltage changes in either direction.

The monitor control circuit comprises a capacitor 58 connected in series with the coils 60 of a balanced relay. The D.C. voltage across resistor 56 is applied to this circuit and the capacitor charges up to the applied voltage. Any sudden change in the applied voltage will cause capacitor 58 to change its charge and the balanced relay will be energized, operating armature 63 to close with either contact 61 or 62.

When the armature 63 is operated, a closed circuit is made between battery 65 and alarm relay coil 64. Capacitor 66 is in parallel with the relay coil 64 to control its operation. Armature 68 is normally closed on contact 67. After energization of relay coil 64, armature 68 closes on contact 69 to place the circuit containing the neon indicator 71 and current limiting resistor 70 across the battery 65. At the same time the horn 72 is sounded. By operating the switch having armature 75 to close with contact 73, the horn 72 may be turned off while the neon bulb 71 remains lighted. After the relay coil 64 has de-energized and armature 68 returned to close with contact 67, the horn again sounds to remind the guard to reset the switch having armature 75 to the contact 74 closed position.

While the invention has been disclosed with respect to a single preferred embodiment, it will be apparent to those skilled in the art that numerous variations and modifications may be made within the spirit and scope of the invention and thus it is not intended to limit the invention except as defined in the following claims.

What is claimed is:

1. A system for the protection of a security area from intruders comprising a sensing capacitor having first and second plates disposed in the security area, a detector comprising a transistor two-stage astable multivibrator and rectifier means connected to the multivibrator for rectifying the output of said multivibrator and producing a direct current output signal proportional to the multivibrator output, an alarm device, monitor means disposed at a location removed from said security area and operable to respond to only sudden changes in an input signal and actuate said alarm device, line means connecting the output signal of the rectifier means to the monitor means as an input signal and connecting said first sensing capacitor plate to the collector of one stage of said multivibrator, said second sensing capacitor plate being directly connected to the base of said one stage.

2. A system for the protection of a security area from intruders as claimed in claim 1, wherein said first sensing capacitor plate is at ground potential and the connection of said first sensing capacitor plate to said detector through said line means is made by a ground connection at said monitor to said line means.

3. In a system for protecting a security area, a sensing capacitor comprising first and second plates disposed in the security area, a transistor two-stage, astable multivibrator, means including said sensing capacitor connected to said multivibrator for controlling the amplitude output of the multivibrator in response to any change in said sensing capacitance, means rectifying the output of said multivibrator for applying a direct current voltage to an output line.

4. In a system for protecting a security area, a sensing capacitor comprising first and second plates disposed in the security area, a transistor two-stage, astable multivibrator, means including said sensing capacitance providing feedback between the collector and base of one stage of said multivibrator, and thereby operable to control the amplitude output of said multivibrator in response to any change in sensing capacitance, means rectifying the output of said multivibrator for applying a direct current voltage to an output line.

5. In a system for protecting a security area, a sensing capacitor comprising first and second plates disposed in the security area, a transistor two-stage, astable multivibrator, electrical connection from said first sensing capacitor plate to the base of one stage of said multivibrator, an electrical connection from said second sensing capacitor plate to the collector of said one stage to thereby render the sensing capacitor capable of controlling the output amplitude of said multivibrator, means rectifying the output of said multivibrator for applying a direct current voltage to an output line.

No reference cited.